United States Patent [19]
Hanseman

[11] 3,778,542
[45] Dec. 11, 1973

[54] BLUE SCREEN TRAVELLING MATTE SYSTEM

[75] Inventor: Leo C. Hanseman, Burbank, Calif.

[73] Assignee: Technicolor Inc., Hollywood, Calif.

[22] Filed: Nov. 30, 1970

[21] Appl. No.: 93,574

[52] U.S. Cl. .......................... 178/5.4 R, 178/DIG. 6
[51] Int. Cl. .......................... H04n 9/00, H04n 5/22
[58] Field of Search .................... 178/DIG. 6, 5.2 R, 178/5.4 R, 5.4 CD

[56] References Cited
UNITED STATES PATENTS

| | | | |
|---|---|---|---|
| 3,560,638 | 2/1971 | Skrydstrup | 178/5.4 R |
| 3,595,987 | 7/1971 | Vlahos | 178/DIG. 6 |

*Primary Examiner*—Benedict V. Safourek
*Assistant Examiner*—George G. Stellar
*Attorney*—Lyon & Lyon

[57] ABSTRACT

There is disclosed herein apparatus and methods for the creation of special photographic effects, such as blue screen travelling matte effects. A particular selectable saturated color appearing in the simultaneous red, blue and green video output signals of an electronic color camera, for example, is sensed and removed from the video signals by electronic subtraction of the selected color. The output red, blue and green video signals derived from a second electronic color camera are substituted for the removed saturated color. The final composite red, blue and green video output signals therefore contain picture elements from both cameras, combined in a manner such that the specific saturated color from the first camera is completely eliminated and replaced by picture elements derived from the second camera.

21 Claims, 8 Drawing Figures

INVENTOR.
LEO C. HANSEMAN
BY Lyon & Lyon
ATTORNEYS

INVENTOR
LEO C. HANSEMAN
BY Lyon & Lyon
ATTORNEYS

PATENTED DEC 11 1973 3,778,542

SHEET 3 OF 8

INVENTOR.
LEO C. HANSEMAN
BY Lyon & Lyon
ATTORNEYS

INVENTOR.
LEO C. HANSEMAN
BY Lyon & Lyon
ATTORNEYS

INVENTOR.
LEO C. HANSEMAN
BY Lyon & Lyon
ATTORNEYS

INVENTOR.
LEO C. HANSEMAN
BY Lyon & Lyon
ATTORNEYS

INVENTOR.
LEO C. HANSEMAN
BY Lyon & Lyon
ATTORNEYS

INVENTOR.
LEO C. HANSEMAN
BY Lyon & Lyon
ATTORNEYS

BLUE SCREEN TRAVELLING MATTE SYSTEM

The "blue screen travelling matte" process, in various forms, has been known and successfully utilized by the motion picture industry for many years in the creation of special photographic effects. An electronic blue screen system known commercially as chroma key has, in spite of certain limitations, been widely used in commercial television production.

All travelling matte systems have certain common characteristics — the action phase is photographed against a colored backing or screen of high saturation, producing what is known as the foreground scene. By photographic (or, in the case of chroma key, electronic) systems and methods the color backing is removed from the foreground scene and is replaced by a background scene which is photographed separately. The final picture, therefore, contains (a) the foreground action that is photographed against the colored backing, and (b) the background scene, combined photographically or electronically.

In the chroma key system a foreground camera may, for example, photograph a girl smoking a cigarette in front of a blue painted screen. The electronic chroma key device is capable of sensing specific colors and, in this case, would be adjusted to sense the blue of the background screen. The electronic signal thus derived from the blue screen portion of the foreground camera is utilized within the device to generate a "keying" signal which, in turn, is used in a television special effects amplifier to switch "off" the blue portions of the picture from the foreground camera, and simultaneously to switch "on" the background picture information generated by the second electronic camera. Since switching techniques are used to combine the two camera signals, the system operates properly only when the blue background is uniformly lighted, and when edge transitions between the blue background and the foreground subject are particularly well defined. For this reason, the chroma key system does not sense fine detail such as smoke, and it does not operate properly when transparent or semi-transparent materials appear with the subject in the foreground.

The relatively high brightness of the blue screen background used in travelling matte systems, combined with the optical flare introduced by all complex optical systems, particularly television zoom lenses, results in a false blue halo around objects appearing in front of the blue screen. A girl's black hair will, for example, have blue edges. A man's black suit will take a bluish cast.

The new electronic blue screen travelling matte system and methods described herein involves a subtraction concept rather than a switching technique to remove the blue background. Practice of the present concepts not only enables removal of the undesired blue background, but also eliminates blue flare and halo components appearing within and around the foreground subject. All blue areas photographed by the foreground camera, in this example, are thus rendered black, but smoke, and even transparent or semi-transparent materials will be clearly visible and accurately reproduced in terms of gray scale, hue and color saturation.

Fine detail, such as the single strands of a girl's hair, cannot be resolved by the chroma key system because the derived switching signal does not operate at sufficient speed. The invention described herein, operating on a subtraction principle rather than the keying principle, is capable of producing travelling mattes of unusually high definition and superior image quality. It is believed that the flexibility and versatility of the system will allow producers, directors and other creative people to establish new techniques of special effects photography and production.

Accordingly, it is a principal object of the invention to provide an improved system and methods of producing blue screen travelling matte effects.

It is another object of this invention to provide an electronic system for producing blue screen travelling matte effects for television.

It is another object of this invention to provide an electronic system for producing blue screen travelling matte effects for motion pictures.

A further object of this invention is to enable improvement of color motion picture and television productions.

Briefly, there is disclosed herein improved electronic apparatus and methods for the creation of blue screen travelling matte photographic special effects. The apparatus disclosed electronically senses a specific, selectable, saturated color appearing in the simultaneous red, blue and green video output signals of an electronic color camera or other suitable device, removes from the video signals of the camera, by electronic subtraction circuitry, the saturated color selected, and substitutes, for the removed saturated color, the red, blue and green video output signals derived from a second electronic color camera or other suitable device. The final red, blue and green video output signals, therefore, contain picture elements from both cameras, combined in a manner such that the specific saturated color from the first camera, selected in the adjustment of the system, is eliminated, and replaced by picture elements derived from the second camera.

These final outputs may then be routed, in the case of color television applications, to an NTSC or PAL encoding device for the development of standard NTSC or PAL color television signals or, in the case of motion picture applications, to suitable high definition color film recording devices. An exemplary high definition color system of this latter nature is disclosed in U.S. patent application Ser. No. 825,291, (Joseph E. Bluth et al), filed May 16, 1969, entitled "High Definition Color Picture System," the disclosure of which is incorporated herein by reference, now U.S. Pat. No. 3,617,626.

The present concepts are unique in that, because of the techniques and circuitry employed, a distinction can be made between a specific saturated color and transparent or semi-transparent objects appearing simultaneously in time with the saturated color. The system can function at any desired line or field scanning standard with any electronic camera, video tape recorder, or other device or system capable of generating simultaneous red, blue and green video signals.

Other objects and features of the present invention will become better understood through a consideration of the following description taken in conjunction with the drawings in which.

Figure 1:
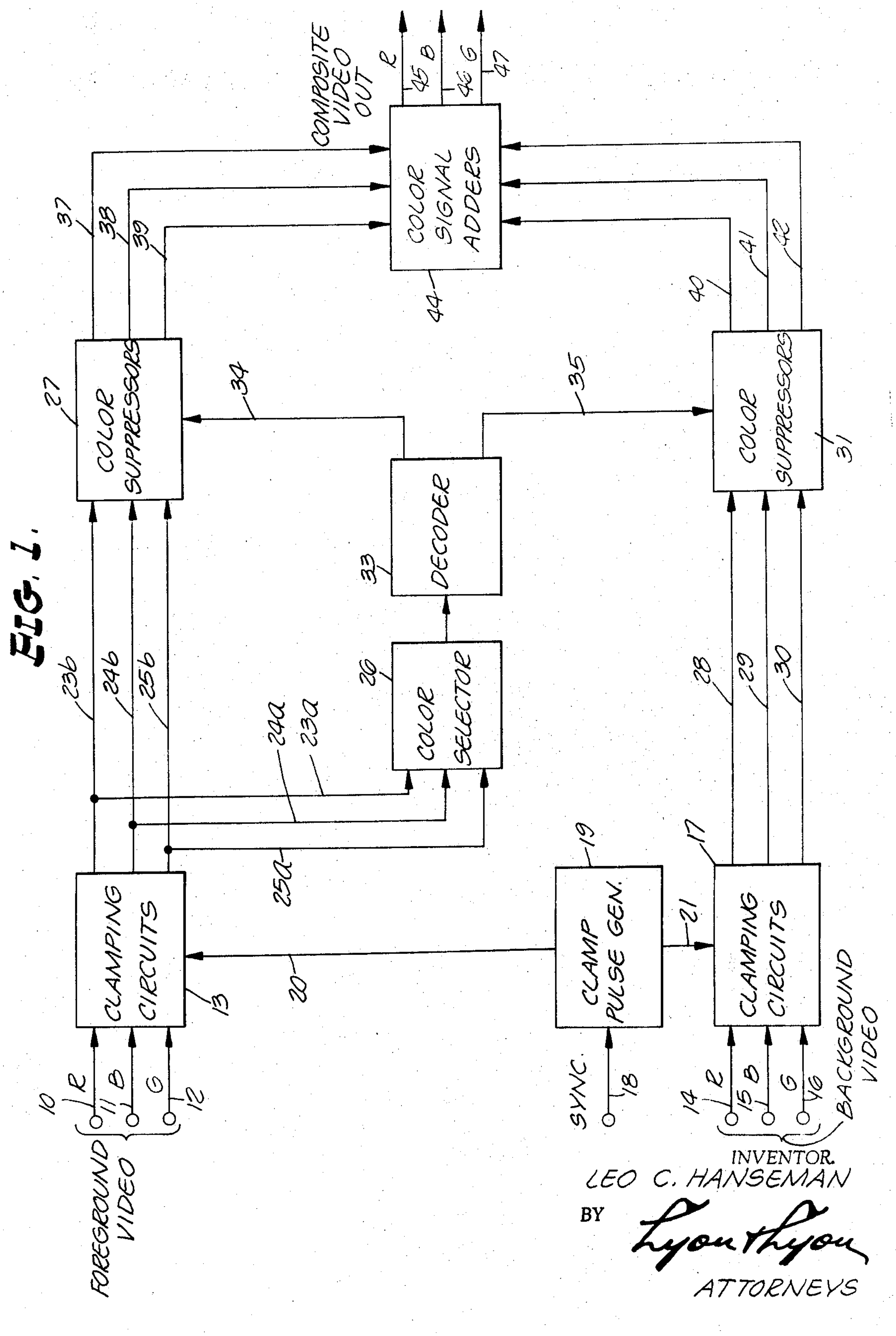
FIG. 1 is a block diagram of an exemplary electronic system in accordance with the concepts of the present invention.

In discussing the present concepts reference will be made to foreground and background electronic color cameras, but it is to be understood that foreground and background information can be derived from other sources, such as video tape recorders, suitable sensors for deriving red, blue and green signals from foreground and background motion picture film, and so forth. Additionally, an example of a girl in front of a blue painted screen will be used herein as exemplary of the foreground scene, and a landscape will be used as exemplary of a background scene but, of course, any suitable scenes may be involved in the practice of the present concepts.

Turning now to the drawings, the foreground scene is picked up by a color video camera, and the resulting foreground video is applied by lines 10 through 12 to clamping circuits 13. The background scene is similarly picked up, and the background video is applied through lines 14 through 16 to clamping circuits 17. A sync input line 18 is connected to a clamp pulse generator 19 to which in turns supplies a clamp pulse to the clamping circuits 13 and 17. These latter circuits merely lock down the incoming DC levels in a conventional manner. The six color channels (three foreground and three background) are reset to zero volts (black level) during each horizontal retrace time, which typically is approximately 11 microseconds. A horizontal sync pulse, which is common to boeh the foreground and background sources, is used to trigger the clamp pulse generator 19. Certain television systems have timing or video pulses that also occur during the first 4 or 5 microseconds of the retrace time. In order to avoid clamping the input video at some undesired level caused by these signals, the clamp pulse generator 19 is triggered from the leading edge of the horizontal sync pulse and then delayed several, such as 2 to 5, microseconds before generating the clamp pulse applied by lines 20 and 21 to the respective clamping circuits 13 and 17. Each clamp pulse grounds the inputs of all clamps within the clamping circuits by means, for example, of fast acting field effect transistors, so that all inputs are zero when the next line of video appears.

The clamped foreground video signals are applied by lines 23*a* through 25*a* to a color selector 26 and by lines 23*b* through 25*b* to color suppressors 27. The clamped background video signals are applied by lines 28 through 30 to color suppressors 31. As will appear subsequently, the color selector 26 is variable so as to select the particular color signal of the foreground video to be eliminated in the final, composite video output. The output of the color selector 26 is applied to a decoder 33 which provides an output signal on a line 34 to indicate which video signals are to be eliminated or subtracted out, and provides a signal on a line 35 to essentially cut a hole in the background video where the remaining foreground video is to be inserted.

The signals on the lines 34 and 35 control the operation of the color suppressors 27 and 31, respectively, Such that the suppressors 27 provide red, blue and green outputs on lines 37 through 39, minus the subtracted video (the blue background of the girl of the foreground scene), and the suppressors 31 provide red, blue and green outputs on respective lines 10 through 42, minus the subtracted video (the area of the landscape of the background scene into which the girl is to be matted). Stated another way, the color signals on the lines 37 through 39 represent the foreground material to fit in the hole cut in the background scene, and the color signals on the lines 40 through 42 provide the background scene with the hole cut therein.

The signals on the lines 37 through 39 and the lines 40 through 42 are applied to color signal adders 44 which in turn provide composite video output signals on output lines 45 through 47. In the present example, the video signals on lines 37 through 39 are of the girl of the foreground scene minus her background, and the signals on the lines 40 through 42 are of the background landscape scene, but with a hole or holes cut therein. The signals on the output lines 45 through 47 thus represent the composite scene with the girl matted on the landscape.

Figure 2:
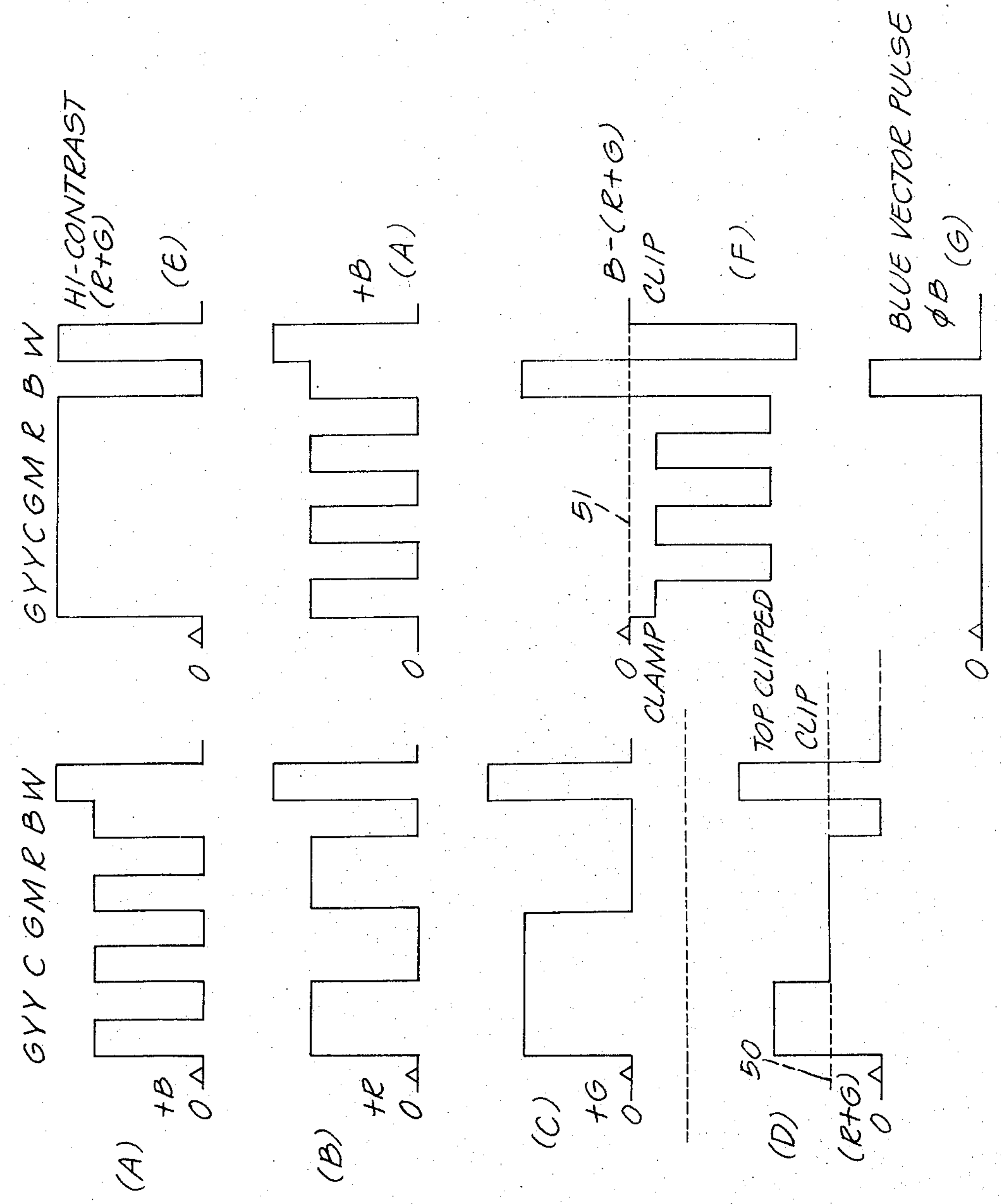
FIG. 2 is an example waveform diagram illustrating derivation of a blue vector pulse employed in the system of FIG. 1.

Before proceeding with a more detailed description, reference will be made to the waveforms shown in FIG. 2. Diagrams A, B and C respectively illustrate blue, red and green color bar signals. These are standard color bar signals, and the waveforms shown would be of different amplitudes if a scene or object were depicted by these signals. Waveform D is an addition of the red and green waveforms B and C. The waveform shown in D is clipped above a dashed line 50 to derive a clipped and amplified waveform E. Waveforms A and E are subtracted to obtain waveform F. Waveform F is clipped below dashed line 51 to derive waveform G, which is termed a blue vector pulse, and which is representative of the blue background used in this example for the foreground scene. This is the blue background to be subtracted from the foreground scene.

As an example, a foreground object such as a girl singer standing in front of a particular blue background (such as a painted wall) is picked up by an electronic color television camera. The blue, red and green signals are the foreground signals applied to input lines 10 through 12 in FIG. 1 and are processed in the manner illustrated in FIG. 2 to derive the blue vector pulse shown in waveform G. The signals from the background scene, such as a landscape, are derived live, from a color slide, from video tape, or from another suitable source. The foreground girl and background landscape signals are added together, with the blue vector pulse being used to punch a hole in the background and to insert the girl in the hole in the landscape which is to form the ultimate background. The final signals are red, blue and green simultaneous video signals representing the composite scene. These signals may be applied directly to a color monitor, or suitably encoded into any desired format.

In a sense, it may be stated that the foreground video input is used to generate background and foreground blanking gate signals which synchronize the occurrence of the background and foreground video in the picture. These gates are generated in the decoder by combining the three color channels from the foreground camera, and then subtracting out all colors except the background color selected for blanking. For example, if the selected background color is blue, the system will mechanize the equation 2B - (R+G). The quantity 2B rather than B is used to ensure that white video is not distorted. If the selected background were red or green, the equation would be adjusted accordingly. In an exemplary system as disclosed herein, the equation is mechanized with a tapped, continuous rotation potentiometer, and a differential operational amplifier, which provide a continuous variation in the background color to be selected for blanking.

Figure 3:
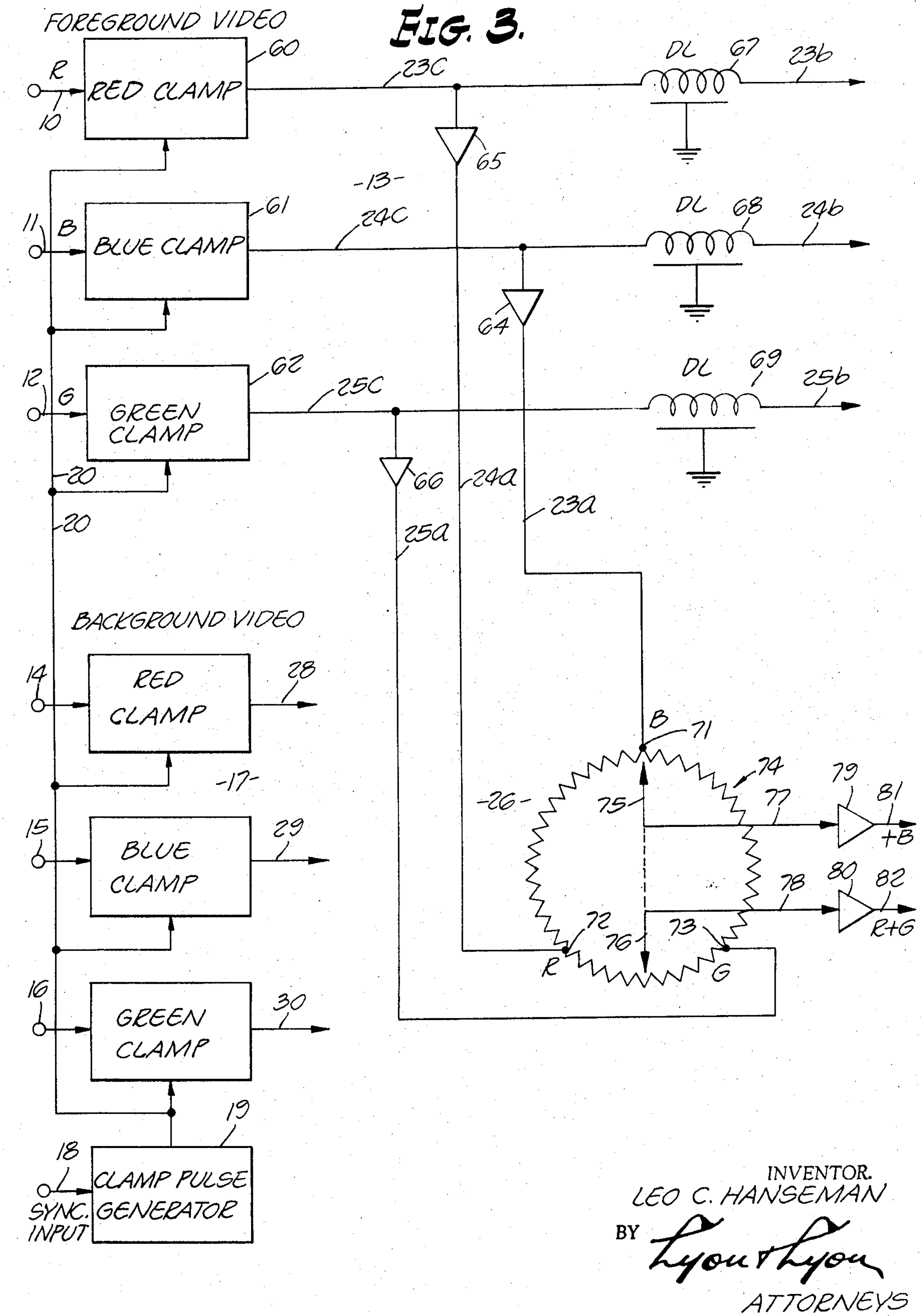
FIGS. 3 through 5 are detailed block diagrams of the system of FIG. 1.
Figure 4:
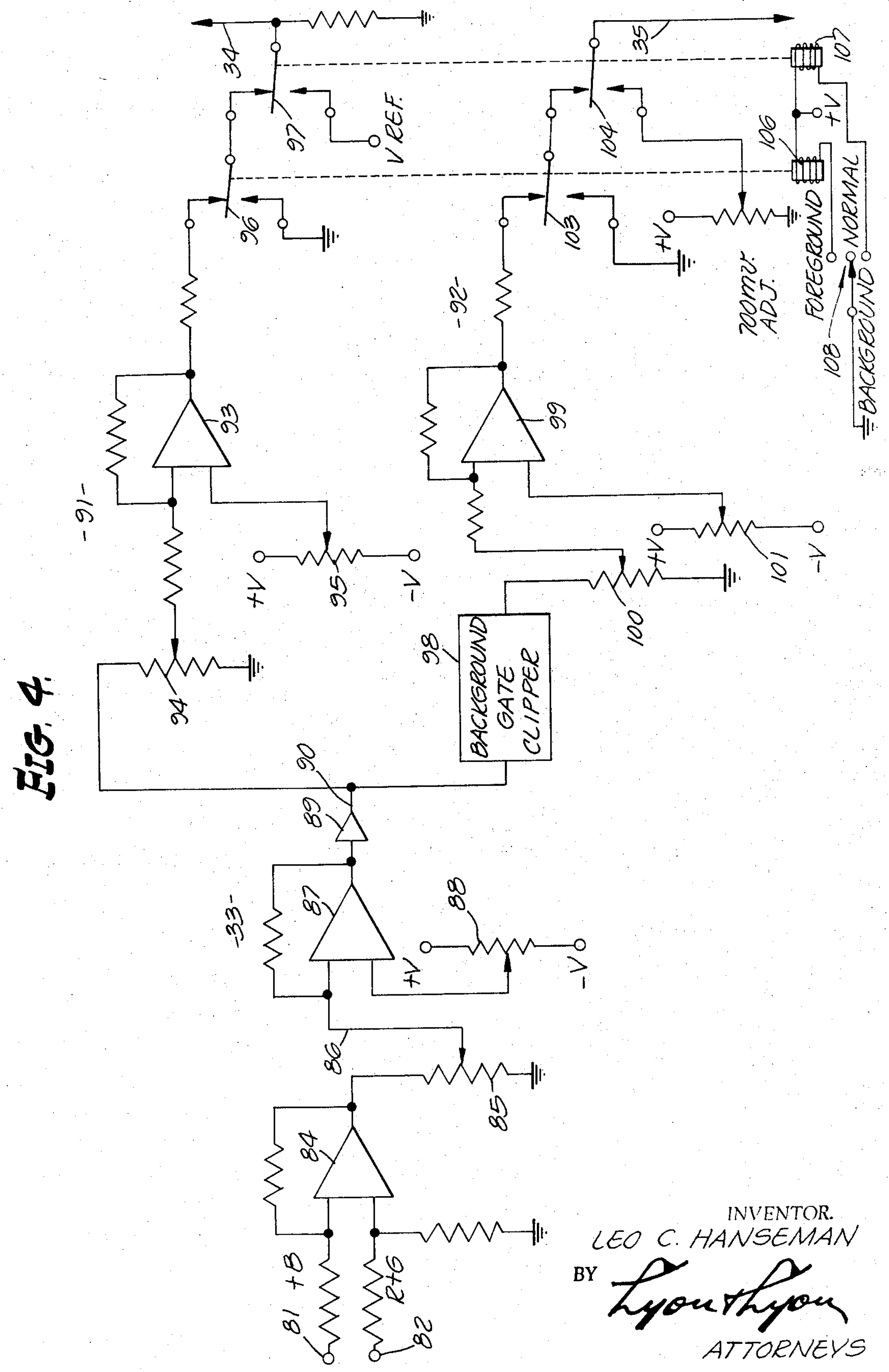
Figure 5:
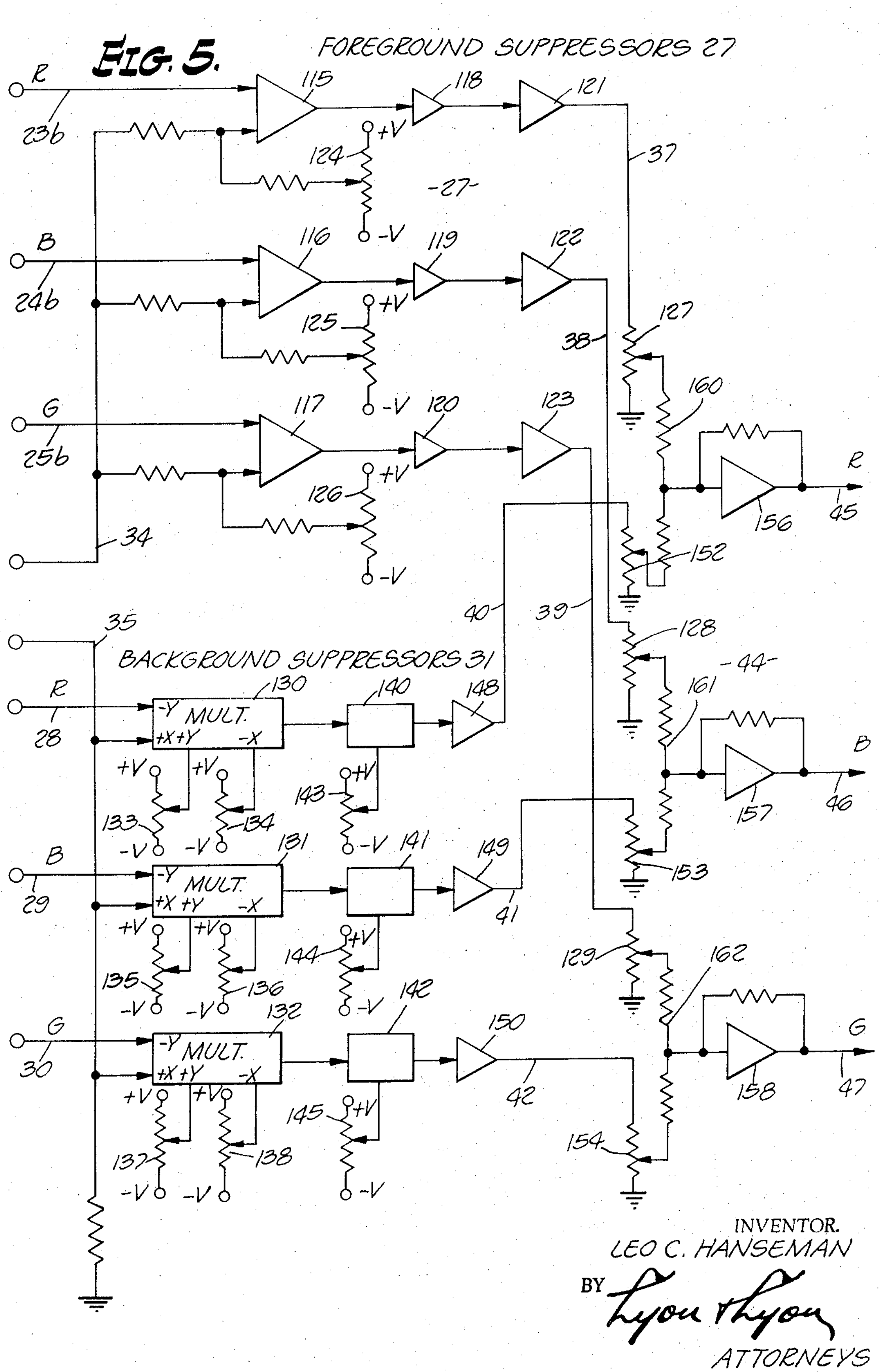

Turning to FIGS. 3 through 5, the clamping circuits 13 include three clamps 60 through 62 as shown in FIG. 3 having applied thereto the foreground video red, blue and green input signals on respective lines 10 through 12. The clamp pulse is applied on the line 20 from the clamp generator 19. The clamp generator 19 is triggered from the leading edge of the horizontal sync pulse, and has an adjustable time constant to allow the output thereof to be delayed 2 to 5 microseconds before generating the output clamp pulse. The video outputs from the clamps 60 through 62 are applied on respective lines **23*c* through 25*c* through respective emitter followers 64 through 66 to the output lines 23*a* through 25*a*. The lines 23*c* through 25*c* are connected through respective delay lines 67 through 69 to the output lines 23*b* through 25*b* which are connected ultimately to the color suppressors 27. The delay lines 67 through 69** compensate for the delays of the color selector and decoder.

The three foreground color signals on lines **23*a* through 25*a*, respectively, are connected to three taps 71 through 73 on a color selector potentiometer 74 electrically spaced 120° apart. Two wiper arms 75 and 76 have an electrical spacing of 180° as shown in FIG. 3. Assuming that a blue background has been selected for blanking, the upper wiper 75 of the potentiometer 74 is positioned at the B tap 71, and the other wiper 76 lies half-way between the R and G taps 72 and 73. The output voltage on the upper wiper 75 therefore is proportional to B, while the output from the second wiper 76 is (R+G)/2. These signals are applied by respective lines 77 and 78 to emitter followers 79 and 80. The outputs of the emitter followers are connected by lines 81 and 82 to a differential operational amplifier 84** which has suitable external gain resistors. These inputs are summed to result in the desired 2B - (R+G) output.

The output of the differential amplifier 84 is applied through a gain adjusting potentiometer 85 and a line 86 to an inverter amplifier 87 having a clip level adjusting potentiometer 88. The 2B - (R+G) signal will be positive and negative with respect to zero level (ground); the B component being positive and the (R+G) component being negative. Since the actual video signals are being combined, the blue components of all three foreground channels are added together. Similarly, the reds and greens are also combined. Then, by clipping all signals below ground in a clipper amplifier 89, the (R+G) component is effectively subtracted out, leaving a pure blue control gate signal on an output line 90 that generally corresponds to the total of all blue in the scan. In addition, the amplitude of the gate signal is proportional to the intensity of the blue. At this point, the gate signal goes to control circuits 91 and 92 for the foreground and background suppressors 27 and 31, respectively.

In the foreground control circuit 91, the gate signal on the line 90 is amplified by a foreground gate amplifier 93 to provide an output that varies, for example, from zero to approximately 700 millivolts, maximum. A level adjustment potentiometer 94 is employed to ensure that the gate signals never drop below zero (black level). A zero set potentiometer 95 is provided to set the black level. The resulting suppression gate signal is applied through relay switches 96 and 97 to the output line 34 which in turn goes to the color suppressors 27 which are shown in detail in FIG. 5, and will be discussed subsequently.

The background control circuit 92 is similar to the foreground circuit 91, but includes an additional negative voltage clipper circuit 98 to ensure a solid zero reference, and a gate amplifier 99 similar to the amplifier 93 is the foreground channel. A level adjustment potentiometer 100 and zero setting potentiometer 101 also are provided. The output of the gate amplifier 99 is applied through switches 103 and 104 to the output line 35, and the output gate signal, which goes to the suppressors 31, has a polarity the same as the suppressor gate signal on the output line 34.

The switches 96 and 103 are operated by a relay winding 106, and the switches 97 and 104 are operated by a relay winding 107. The relay windings 106 and 107 are controlled by a three position switch 108, which is a test switch to allow a normal operation in which matting takes place or to allow solely the foreground or solely the background signals to be passed to the output of the system without matting.

The color suppressors 27 and 31, as well as the color signal adders 44 are shown in detail in FIG. 5. The foreground suppressor circuits 27 include three differential amplifiers 115 through 117 followed by respective clipper amplifiers 118 through 120 which in turn are followed by emitter followers 121 through 123. Centering adjustment potentiometers 124 through 126 are provided for the amplifiers 115 through 117. The lines 23b through 25b which supply the red, blue and green clamped video from the clamping circuits 13 are applied as inputs to the respective amplifiers 115 through 117, along with the suppression gate signal on the line 34 from the suppression control circuit 91 in FIG. 4. The output lines 37 through 39 of the foreground suppressors 27 are connected to respective potentiometers 127 and 129 in the color signal adder circuits 44.

The background suppressor circuits 31 include three multipliers 130 through 132 which respectively receive the red, blue and green background video signals on the lines 28 through 30 from the clamping circuits 17. These multipliers also receive the gate signal on the line 35 from the background suppression circuit 92 of FIG. 4. Balancing potentiometers 133 through 138 are provided to balance the $x$ and $y$ inputs to the amplifiers (to provide a zero output for zero inputs). The outputs of the multipliers 130 through 132 are applied to respective centering circuits 140 through 142 which include respective zero set potentiometers 143 through 145. The outputs from the centering circuits are applied through respective emitter followers 148 through 150 to the output lines 40 through 42. These output lines are connected to respective potentiometers 152 through 154 of the adders 44.

When the foreground camera is scanning the background that is to be blanked (blue in the example), the suppression gate signal on the output line 34 will be at or near its maximum value of 700 millivolts. By subtracting this high amplitude gate signal from the foreground video (which is accomplished in the color suppressors 27), the undesired (blue background) foreground video is essentially suppressed. When the camera scans the desired foreground object (girl), a minimum amount of the background color (blue in this example) will be present, and the gate signal amplitude will approach zero. The foreground video will then pass unattenuated through the color suppressors 27.

The foreground and background processing differs in that the background channel uses multipliers as noted above as suppressors rather than differential amplifiers. However, the background suppressors can be identical to the foreground suppressors (differential amplifiers instead of multipliers) and likewise both suppressors can be multipliers.

When the foreground camera is scanning the background to be blanked (blue background in the example), the gate signal into the background color suppressors on the output line 35 is at or near its maximum amplitude of 700 millivolts. Since the gate amplitude on the line 35 is used as a multiplier in each of the background camera video channels, the generation of a high amplitude gate signal will allow maximum output from the background camera to pass through the suppressors 31. When the foreground camera scans the desired foreground object (the girl), the gate signal on the line 35 will approach zero, thereby causing the background camera video to be multiplied by zero, thus causing minimum output from the suppressors 31.

the adders 44 include amplifiers 156 through 158 having respective resistive input dividers 160 through 162 coupled to the respective potentiometers 127–152, 128–153 and 129–154 which receive the foreground and background signals from the suppressors 27 and 31. As will be apparent to those skilled in the art, the adders 44 serve to add together the foreground video on the lines 37 through 42 to provide the composite video output on the lines 45 through 47. The amplifiers 156 through 158 are summing amplifiers, and the final three channel output from the adders 44 represents a composite video signal in which the suppressors 27 and 31 synchronize the output video between the foreground and background cameras.

Figure 6:
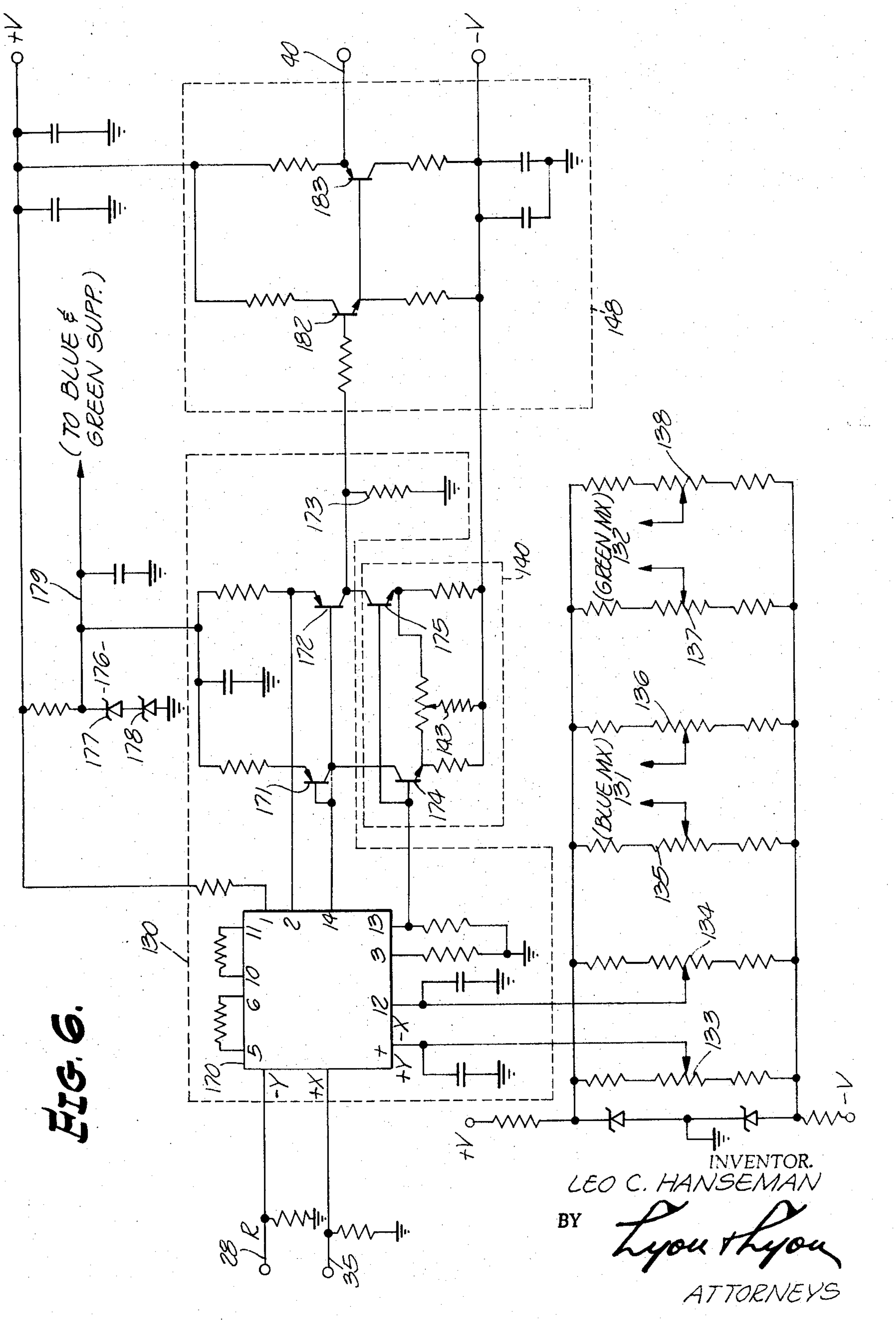
FIG. 6 is a circuit diagram of one of the background suppressors of FIG. 5.

FIG. 6 is a circuit diagram illustrating one of the background suppressors including the multiplier 130, centering circuit 140, and amplifier 148. The multiplier includes an integrated circuit 170, such as a Motorola multiplier MC1495L which has a current source output at output terminals 2 and 14 thereof coupled to transistors 171 and the transistor 171 serves as a diode to compensate for the base-emitter drop of the transistor 172, and the transistor 172 serves as an output amplifier feeding into a load 173. The centering circuit 140 is connected to an output terminal 13 of the circuit 70, and includes transistors 174 and 175 connected in parallel as constant current sources. The potentiometer 143 is adjusted to provide a zero output across the load resistor 173 for a zero input as noted earlier. The potentiometers 143–145 enable adjustment of the respective centering circuits 140–142 to ensure a zero output thereof for zero *x* and *y* inputs on the respective multiplier, i.e., to take care of any offset caused by adjustment of the respective multiplier.

A regulated voltage supply 176, including zener diodes 177 and 178, is provided and has an output line 179 coupled to the output circuit of the multiplier including the transistors 171–172, as well as the similar circuit for the multipliers 131 and 132 of FIG. 5. Another voltage source 180 provides the voltage for the balancing potentiometers 133 and 134 which are connected to terminals 4 and 12 of the integrated circuit 170. This source 180 likewise supplies the voltage for the balancing potentiometers 135–136 and 137–138 of respective multipliers 131 and 132. The output of the multiplier 130 is developed across the output load resistor 173 and is applied through the emitter follower 148 including transistors 182–183 to the output line 40 which in turn is connected to the potentiometer 152 at the input of the output adder amplifier 156.

Figure 7:
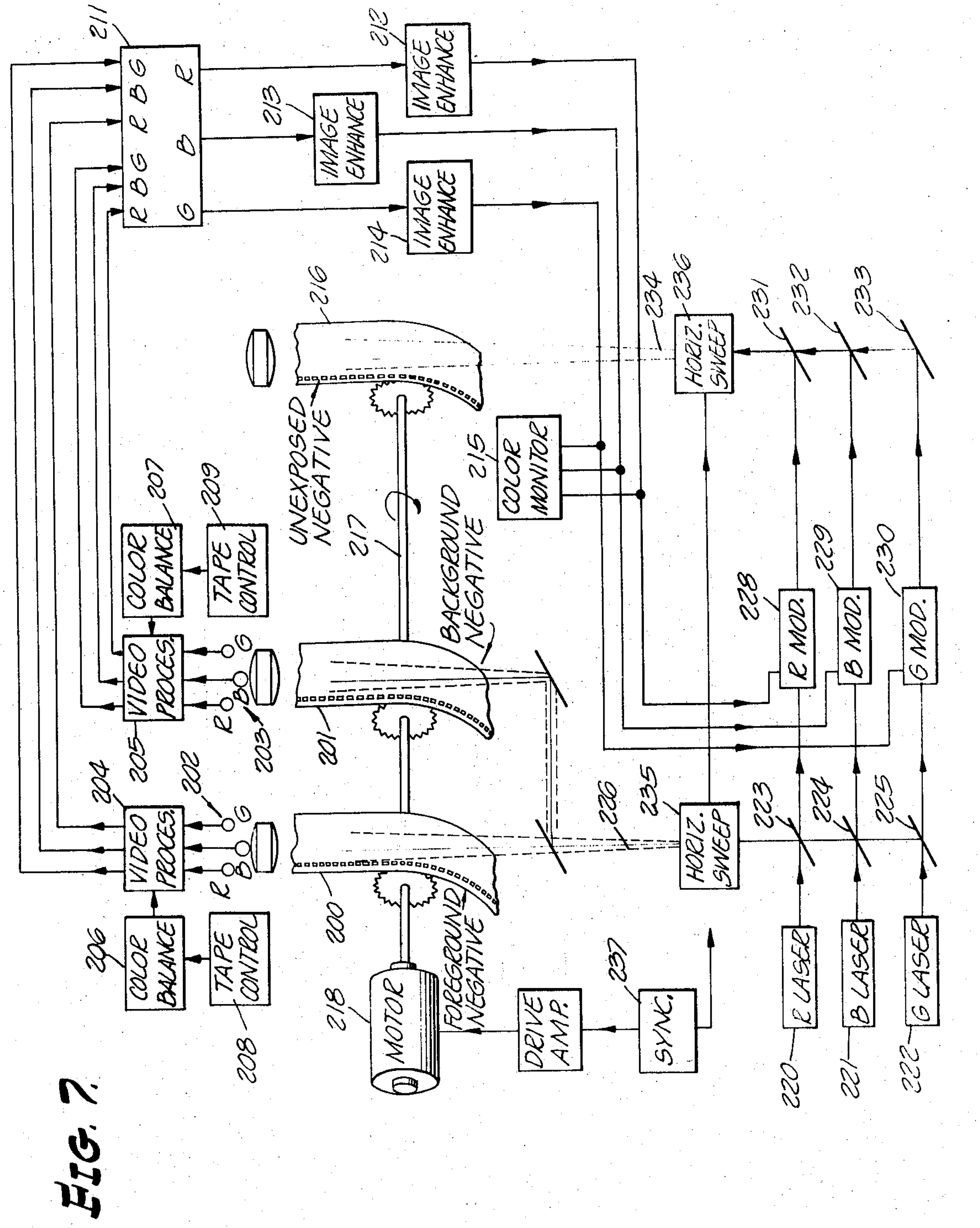
FIG. 7 illustrates a system incorporating the present concepts for producing a composite motion picture film.

Although the foregoing concepts are particularly useful for color television purposes using either live or recorded source information, or a combination of both, the same concepts are equally applicable in motion picture systems. FIG. 7 illustrates a system for providing a final motion picture negative from negatives having foreground and background information, as well as enabling the creation of the desired special effects. In this system, a foreground negative 200 having the desired foreground information, and a background negative 210 having the desired background information are scanned in any suitable manner, as by a laser beam scanning system. The images from these negatives are picked up by respective red, blue and green foreground sensors 202 and background sensors 203 and are applied to video processors 204 and 205. Color balancing controls 206 and 207 are coupled to the respective video processors 204 and 205, and may be controlled by punched tape units 208 and 209, respectively. These controls enable selection and control over color quality. The outputs from the processors 204 and 205 are supplied to an electronic blue screen travelling matte system 211 of the nature illustrated in FIG. 1. The composite video output from the system 211 can be applied through image enhancers 212 through 214 to provide the final video output for recording on color film. A color television monitor 215 may be provided for viewing this final output.

Figure 8:
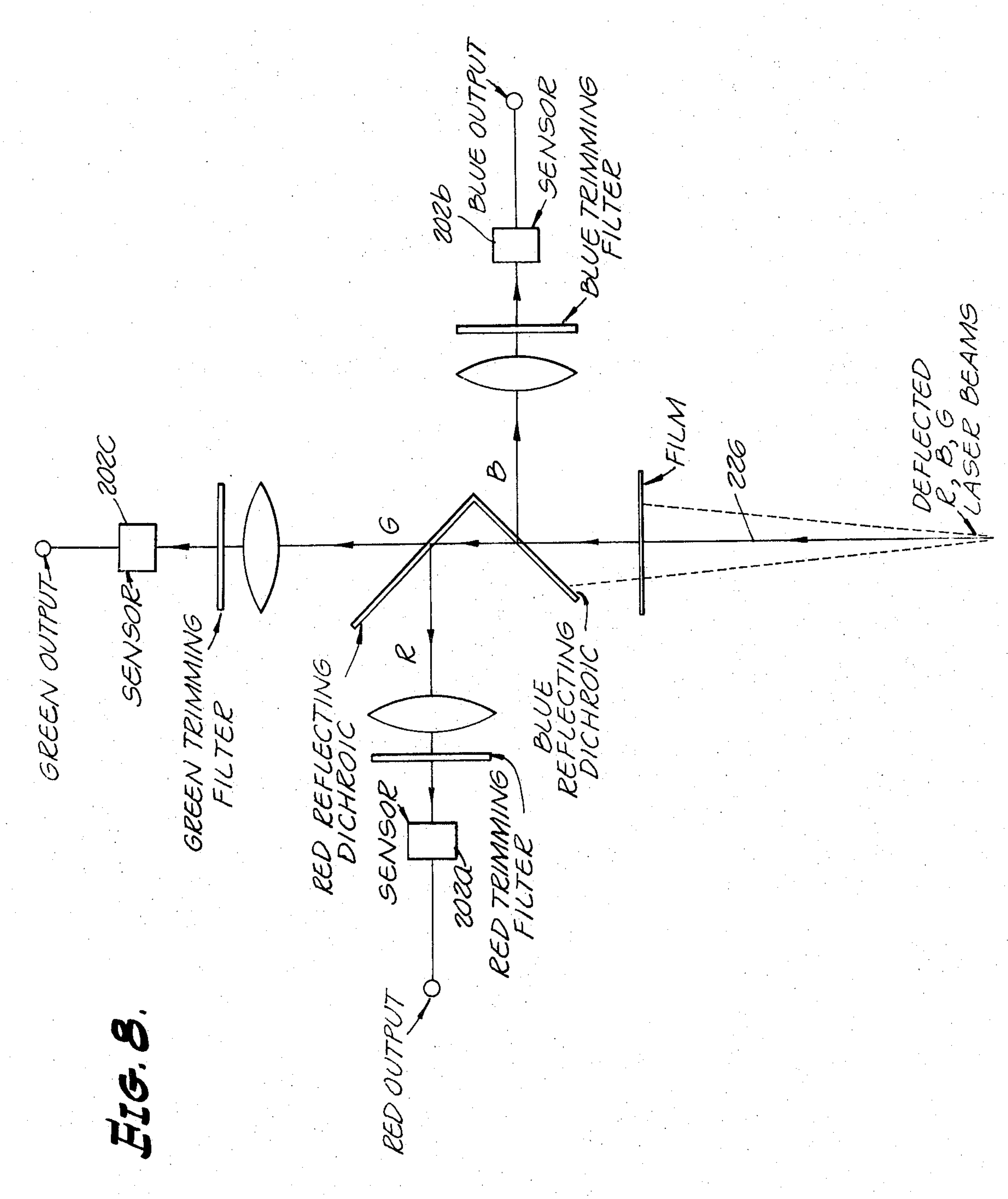
FIG. 8 illustrates an exemplary optical arrangement employed in the system of FIG. 7.

The drive system for the negatives 200 and 201, and an unexposed negative 216, may be from a common shaft 217 driven by a drive motor 218 which is synchronized with the operation of the laser beam scanning system. This latter system includes red, blue and green lasers 220 through 222, the beams of which are directed at color selective reflecting dichroic mirrors 223 through 225 to provide a horizontal sweep beam 226 for deriving the information from the negatives 200 and 201, and for supplying red, blue and green beams to respective modulators 228 through 230. The modulated beams are deflected by color selective reflecting dichroic mirrors 231 through 233 to provide the horizontal sweep beam 234 for recording the final composite color video information on the unexposed negative 216. The horizontal sweep optics 235 and 236 are synchronized with operation of the drive motor 218 by a synchronizer 237. FIG. 8 illustrates an exemplary arrangement for scanning and picking up the information from one of the negatives 200.

With the system of the nature shown in FIG. 7, various special effects operations can be achieved in a very short time as compared with the time presently involved. The system as shown and described is a constant film velocity system, and no laser vertical deflection is required. An intermittent type film movement may be used for the three negatives, including conventional film gates with registration pins, if the laser beams are deflected vertically. The deflection system illustrated in a single system provides for the simultaneous scanning of the foreground and background negatives, as well as the unexposed negative, so as to illuminate geometry errors. Although a common shaft drive is shown for the negatives, the same may be replaced with a suitable servo drive system.

The present embodiment of this invention are to be considered in all respects as illustrative and not restrictive, the scope of the invention being indicated by the appended claims rather than by the foregoing description, and all changes which come within the meaning and range of equivalence of the claims therefore are intended to be embraced therein.

What is claimed is:

1. A system for combining first video signals with second video signals to provide output composite video signals comprising first input means for receiving a plurality of color signals forming first color video signals representing first information, second input means for receiving a plurality of color signals forming second color video signals representing second information, suppressor means coupled with said first input means for receiving video signals passed thereby, and coupled with said second input means for receiving video signals passed thereby, color selector means coupled with said first input means for developing color control signals representing a preselected color of said first information which is to be deleted from said first information, and decoder means coupled with said color selector means for providing output control signals to said suppressor means to cause said suppressor means to suppress said signals representing said preselected color of said first information and to pass certain of said second video signals representing said second information, and combining means coupled with said suppressor means for combining the remaining signals therefrom representing said first and second information to provide composite output signals.

2. A system as in claim 1 wherein said suppressor means comprises first and second color suppressors, said first suppressor being coupled to receive said video signals from said first input means, and said second suppressor being coupled to receive said video signals from said second input means, and said decoder means provides said output control signals to said first and second suppressors.

3. A system as in claim 1 including first and second scanning means for scanning film, and pickup means for generating color signals representative thereof and supplying said first and second video signals to said respective first and second input means, and recording means coupled with said combining means and responsive to said composite output signals for recording the same in visual form on film.

4. A system as in claim 3 wherein said pickup means generates said color signals from motion picture film, and said recording means records said composite output signals in visual form on motion picture film, the scanning of said motion picture films being synchronized.

5. A system as in claim 4 wherein said scanning means comprises color light sources optically coupled to simultaneously scan said films.

6. A system as in claim 5 wherein said first information comprises a foreground color scene and said second information comprises a background color scene respectively on first and second motion picture films, and said recording means including image enhancement means for affecting the image recorded thereby on a third motion picture film.

7. A system for matting a foreground scene derived from a color television camera, color motion picture film or the like into a background scene to provide composite output video signals comprising first input means for receiving foreground color video signals, including signals representing first, second and third colors, second input means for receiving background video signals, suppressor means coupled with said first and second input means for receiving video signals from said first and second input means, color control means coupled with said first input means for developing color control signals, said color control means receiving said first video signals and providing color control signals to said suppressor means which represent a function of a combination of a first and second of said colors subtracted from a function of a third of said colors, said control signals applied to said suppressor means causing the surround of an image of said foreground scene to be suppressed and causing a portion of said background scene to be suppressed where said image of said foreground scene is to be matted into said background scene, and combining means coupled with said suppressor means for combining the unsuppressed signals from said suppressor means to provide composite output signals.

8. A system as in claim 7 wherein said color control means includes impedance means for providing as an output signals representing selectable combinations of said three colors, and including decoder means for receiving said output signals from said impedance means for subtracting video signals representing a function of the summation of two of said colors from video signals representing a function of a third of said colors to provide said color control signals to said suppressor means.

9. A system as in claim 8 wherein said three colors are red, blue and green, said impedance means provides output signals representing (*a*) red plus green and (*b*) blue, and said decoder means combines signals representing said red plus green with said blue to provide said output control signals to said suppressor means.

10. A method of electronically matting a foreground scene into a background scene by generating control signals for suppressing the surround of an image of said foreground scene into which said image is to be matted, comprising the steps of providing first color signals representing said foreground scene, said first color signals representing first, second and third colors, providing second video signals representing said background scene, combining signals of said first video signals representing a function of first and second of said colors to provide a summation signal, subtracting from said summation signal signals of said first video signals representing a function of a third of said colors, and developing therefrom a color vector signal representative of the color of the surround of the foreground image, controlling said first and second video signals with said color vector signal to cause a suppression of the surround of an image of said foreground scene and a suppression of a portion of said background scene into which said image is to be matted to develop resultant signals, and combining said resultant signals to provide composite output signals.

11. A system for combining first video signals with second video signals to provide output composite video signals comprising first input means for receiving a plurality of color signals forming first color video signals representing first information, second input means for receiving a plurality of color signals forming second color video signals representing second information, first suppressor means coupled with said first input means for receiving a plurality of color video signals passed thereby, second suppressor means coupled with said second input means for receiving a plurality of color video signals passed thereby, color selector means coupled with said first input means for developing a color control signal representing a preselected color of said first information, decoder means coupled with said color selector means for developing a color control signal representing a preselected color of said first information, decoder means coupled with said color selector means for providing an output control signal to said first suppressor means to caue said first suppressor means to suppress said first color signals when said color control signal is maximum and to cause said first suppressor means to allow passage of said first color signals when said color control signal is minimum, and said output control signal being applied from said decoder to said second suppressor means to suppress said second color signals when said color control signal is minimum and to cause said second suppressor means to allow passage of said second color signals when said color signal is maximum, said output control signal of said decoder means comprising first and second adjustable signals respectively applied to said first and second suppressor means, and combining means coupled with said first and second suppressor means for combining the remaining signals therefrom representing said first and second information to provide composite output signals.

12. A system for combining first video signals with second video signals to provide output composite video signals comprising first input means for receiving a plurality of color signals forming first color video signals representing first information, said first video signals comprising three color video signals, second input means for receiving a plurality of color signals forming second color video signals representing second information, suppressor means coupled with said first and second input means for receiving video signals passed thereby, color selector means coupled with said first input means for developing color control signals representing a preselected color of said first information which is to be deleted from said first information, and decoder means coupled with said color selector means for providing output control signals to said suppressor means to cause said suppressor means to suppress said signals representing said preselected color of said first information and to pass certain of said second video signals representing said second information, said selector and decoder means being operative to subtract a function of the first and second of said color signals of said first information from a function of the third of said color signals of said first information to provide said output control signals to said suppressor means, and combining means coupled with said suppressor means for combining the remaining signals therefrom representing said first and second information to provide composite output signals.

13. A system for combining first video signals with second video signals to provide output composite video signals comprising first input means for receiving a plurality of color signals forming first color video signals representing first information, said first video signals comprising red, blue and green video signals, second input means for receiving a plurality of color signals forming second color video signals representing second information, suppressor means coupled with said first and second input means for receiving video signals passed thereby, color selector means coupled with said first input means for developing color control signals representing a preselected color of said first information which is to be deleted from said first information, and decoder means coupled with said color selector means for providing output control signals to said suppressor means to cause said suppressor means to suppress said signals representing said preselected color of said first information and to pass certain of said second video signals representing said second information, and said selector and decoder means including means for adding together a function of first and second of said color signals of said first information and for subtracting the result from a function of the third of said color signals of said first information to provide output vector pulses as said output control signals to said suppressor means, and combining means coupled with said suppressor means for combining the remaining signals therefrom representing said first and second information to provide composite output signals.

14. A system for combining first video signals with second video signals to provide output composite video signals comprising first input means for receiving a plurality of color signals forming first color video signals representing first information, second input means for receiving a plurality of color signals forming second color video signals representing second information, suppressor means coupled with said first and second input means for receiving video signals passed thereby, color selector means coupled with said first input means for developing color control signals representing a preselected color of said first information which is to be deleted from said first information, and decoder means coupled with said color selector means for providing output control signals to said suppressor means to cause said suppressor means to suppress said signals representing said preselected color of said first information and to pass certain of said second video signals representing said second information, and said selector means comprising potentiometer means having said first video signals applied thereto as red, blue and green video signals, and including means for selecting from said potentiometer means combinations of said red, blue and green video signals, and combining means coupled with said suppressor means for combining the remaining signals therefrom representing said first and second information to provide composite output signals.

15. A system for combining first video signals with second video signals to provide output composite video signals comprising first input means for receiving a plurality of color signals forming first color video signals representing first information, second input means for receiving a plurality of color signals forming second color video signals representing second information, suppressor means coupled with said first and second input means for receiving video signals passed thereby, color selector means coupled with said first input means for developing color control signals representing a preselected color of said first information which is to be deleted from said first information, and decoder means coupled with said color selector means for providing output control signals to said suppressor means to cause said suppressor means to suppress said signals representing said preselected color of said first information and to pass certain of said second video signals representing said second information, said selector means comprising poteniometer means having said first video signals applied thereto as red, blue and green video signals, and including means for selecting from said potentiometer means (*a*) a function of the summation of two of said color signals of said first information and (*b*) a function of the other of said color signals of said first information, and said decoder means including means responsive to said functions for subtracting said function of the summation from said function of said other color signals, and combining means coupled with said suppressor means for combining the remaining signals therefrom representing said first and second information to provide composite output signals.

16. A system for combining first video signals with second video signals to provide output composite video signals comprising first input means for receiving a plurality of color signals forming first color video signals representing first information, second input means for receiving a plurality of color signals forming second color video signals representing second information, suppressor means coupled with said first and second input means for receiving video signals passed thereby, said suppressor means comprising first and second color suppressors, said first suppressor being coupled to receive said video signals from said first input means, and said second suppressor being coupled to receive said video signals from said second input means, said first color suppressor comprising differential amplifier means, and said second color suppressor comprising multiplier means, color selector means coupled with said first input means for developing color control signals representing a preselected color of said first information which is to be deleted from said first information, and decoder means coupled with said color selector means for providing output control signals to said first and second suppressors to cause said suppressors to suppress said signals representing said preselected color of said first information and to pass certain of said second video signals representing said second information, and combining means coupled with said suppressor means for combining the remaining signals therefrom representing said first and second information to provide composite output signals, said combining means including adder means coupled with said first and second color suppressors.

17. A system for combining first video signals with second video signals to provide output composite video signals comprising first input means for receiving a plurality of color signals forming first color video signals representing first information, second input means for receiving a plurality of color signals forming second color video signals representing second information, suppressor means coupled with said first and second input means for receiving video signals passed thereby, said suppressor means comprising first and second color suppressors with at least said first color suppressor including differential amplifier means, said first suppressor being coupled to receive said video signals from said first input means, and said second suppressor being coupled to receive said video signals from said second input means, color selector means coupled with said first input means for developing color control signals representing a preselected color of said first information which is to be deleted from said first information, and decoder means coupled with said color selector means for providing output control signals to said first and second suppressors to cause said suppressor means to suppress said signals representing said preselected color of said first information and to pass certain of said second video signals representing said second information, and combining means coupled with said suppressor means for combining the remaining signals therefrom representing said first and second information to provide composite out-put signals.

18. A system for combining first video signals with second video signals to provide output composite video signals comprising first input means for receiving a plurality of color signals forming first color video signals representing first information, second input means for receiving a plurality of color signals forming second color video signals representing second information, suppressor means coupled with said first and second input means for receiving video signals passed thereby, said selector means comprising potentiometer means having said first video signals applied thereto as red, blue and green video signals, and including means for selecting combinations of said video signals from said potentiometer means and applying said combinations of video signals to said decoder means, color selector means coupled with said first input means for developing color control signals representing a preselected color of said first information which is to be deleted from said first information, and decoder means coupled with said color selector means for providing output control signals to said suppressor means to cause said suppressor means to suppress said signals representing said preselected color of said first information and to pass certain of said second video signals representing said second information, said decoder means includes input amplifier means responsive to said combinations of video signals from said potentiometer means, and said decoder means including first and second amplifier circuits coupled with said input amplifier means to respectively provide first and second output control signals to said suppressor means, and said suppressor means comprises first and second color suppressors respectively responsive to said output signals from said first and second amplifier circuits of said decoder means, said first suppressor being coupled to receive said video signal from said first input means, and said second suppressor being coupled to receive said video signals from said second input means, and combining means coupled with said suppressor means for combining the remaining signals therefrom representing said first and second information to provide composite output signals.

19. A system for combining first video signals with second video signals to provide output composite video signals comprising first input means for receiving a plurality of color signals forming first color video signals representing first information, second input means for receiving a plurality of color signals forming second color video signals representing second information, first suppressor means coupled with said first input means for receiving a plurality of color video signals passed thereby, second suppressor means coupled with said second input means for receiving a plurality of color video signals passed thereby, color selector means coupled with said first input means for developing a color control signal representing a preselected color of said first information, decoder means coupled with said color selector means for providing an output control signal to said first suppressor means to cause said first suppressor means to suppress said first color signals when said color control signal is maximum and to cause said first suppressor means to allow passage of said first color signals when said color control signal is minimum, and combining means coupled with said first and second suppressor means for combining the remaining signals therefrom representing said first and second information to provide composite output signals.

20. A system for combining first video signals with second video signals to provide output composite video signals comprising first input means for receiving a plurality of color signals forming first color video signals representing first information, second input means for receiving a plurality of color signals forming second color video signals representing second information, first suppressor means coupled with said first input means for receiving a plurality of color video signals passed thereby, second suppressor means coupled with said second input means for receiving a plurality of color video signals passed thereby, color selector means coupled with said first input means for developing a color control signal representing a preselected color of said first information, decoder means coupled with said color selector means for providing an output control signal to said first suppressor means to cause said first suppressor means to suppress said first color signals when said color control signal is maximum and to cause said first suppressor means to allow passage of said first color signals when said color control signal is minimum, and said output control signal being applied from said decoder to said second suppressor means to suppress said second color signals when said color control signal is minimum and to cause said second suppressor means to allow passage of said second color signals when said color control signal is maximum, and combining means coupled with said first and second suppressor means for combining the remaining signals there-from representing said first and second information to provide composite output signals.

21. A system for combining first video signals with second video signals to provide output composite video signals comprising first input means for receiving a plurality of color signals forming first color video signals representing first information, second input means for receiving a plurality of color signals forming second color video signals representing second information, first suppressor means coupled with said first input means for receiving a plurality of color video signals passed thereby, second suppressor means coupled with said second input means for receiving a plurality of color video signals passed thereby, color selector means coupled with said first input means for developing a color control signal representing a preselected color of said first information, decoder means coupled with said color selector means for providing an output control signal to said first suppressor means to cause said first suppressor means to suppress said first color signals when said color control signal is maximum and to cause said first suppressor means to allow passage of said first color signals when said color control signal is minimum, said output control signal of said decoder means comprising first and second adjustable signals respectively applied to said first and second suppressor means, and combining means coupled with said first and second suppressor means for combining the remaining signals therefrom representing said first and second information to provide composite output signals.

* * * * *